United States Patent
Ye et al.

(10) Patent No.: US 6,266,618 B1
(45) Date of Patent: Jul. 24, 2001

(54) METHOD FOR AUTOMATIC DETECTION OF PLANAR HETEROGENEITIES CROSSING THE STRATIFICATION OF AN ENVIRONMENT

(75) Inventors: Shin-Ju Ye, Pau; Philippe Rabiller, Lescar; Naamen Keskes, Pau, all of (FR)

(73) Assignee: Elf Exploration Production (FR)

( * ) Notice: Subject to any disclaimer, the term of this patent is extended or adjusted under 35 U.S.C. 154(b) by 0 days.

(21) Appl. No.: 09/367,161

(22) PCT Filed: Dec. 11, 1998

(86) PCT No.: PCT/FR98/02705

§ 371 Date: Aug. 9, 1999

§ 102(e) Date: Aug. 9, 1999

(87) PCT Pub. No.: WO99/31530

PCT Pub. Date: Jun. 24, 1999

(30) Foreign Application Priority Data

Dec. 15, 1997 (FR) .................................................. 97 15859

(51) Int. Cl.[7] ...................................................... G01V 3/38
(52) U.S. Cl. ............................................................. 702/10
(58) Field of Search ............................... 702/10; 367/35, 367/72, 73

(56) References Cited

U.S. PATENT DOCUMENTS

| | | |
|---|---|---|
| 4,414,656 | 11/1983 | Hepp . |
| 4,791,618 | 12/1988 | Pruchnik . |
| 5,038,378 | 8/1991 | Chen . |
| 5,162,994 | 11/1992 | Torres . |
| 5,299,128 | 3/1994 | Jean-Noel et al. . |
| 5,661,698 | 8/1997 | Cacas . |

OTHER PUBLICATIONS

"Automatic Identification of Bedding Planes from Electrical Borehole Images"; Shinju Ye, et al.; 9th Scandinavian Conference on Image Analysis; Jun. 6–9, 1995; Uppsala, Sweden.

"Automatic High Resolution Sedimentary Dip Detection on Borehole Imagery", Shinju Ye, et al.; SPWLA, 38th Annual Logging Symposium, Jun. 15–18, 1997; pp. 1–13.

Society of Petroleum Engineers; "A Method to Derive Dips from Bed Boundaries in Borehole Images"; J.N. Antoine, et al.; SPE 20540; 65th Annual Technical Conference and Exhibition; New Orleans, LA; pp. 121–130, Sep. 23–26, 1990.

(List continued on next page.)

Primary Examiner—Donald E. McElheny, Jr.
(74) Attorney, Agent, or Firm—Ostrolenk, Faber, Gerb & Soffen, LLP

(57) ABSTRACT

Method for automatic detection of planar heterogeneities crossing the stratification of an environment. This method for automatic detection of planar heterogeneities crossing the stratification of an environment, from images of borehole walls or developments of core samples of the said environment, in which an original image defined in a system of axes ($X_1$, $Y_1$, $Z_1$) which is associated with a borehole whose axis is $Z_1$ is used, the said image containing, for a zone of the environment through which the borehole passes, planar heterogeneities consisting of stratification planes (2 to 14) and of planar heterogeneities (15 to 23) intersecting the stratification planes, is characterized in that it consists in:

determining a dominant orientation of the stratification planes which lie in at least one part of the said original image, filtering the original image in order to eliminate the planar heterogeneities of the stratification planes (2 to 14) which lie in the dominant direction, and determining, on the said filtered image, at least contour segments (15' to 23') of the heterogeneities which intersect the stratification planar heterogeneities.

13 Claims, 3 Drawing Sheets

OTHER PUBLICATIONS

"A New Approach to Determining Dip and Strike Using Borehole Images"; D. Torres, et al.; SPWLA 31$^{st}$ Annual Logging Symposium; Jun. 24–27, 1990.

"Automatic Extraction and Characterisation of Geological Features and Textures from Borehole Images and Core Photographs"; Jonathan Hall, et al.; SPWLA 37$^{th}$ Annual Logging Symposium, Jun. 16–19, 1996; pp. 1–13.

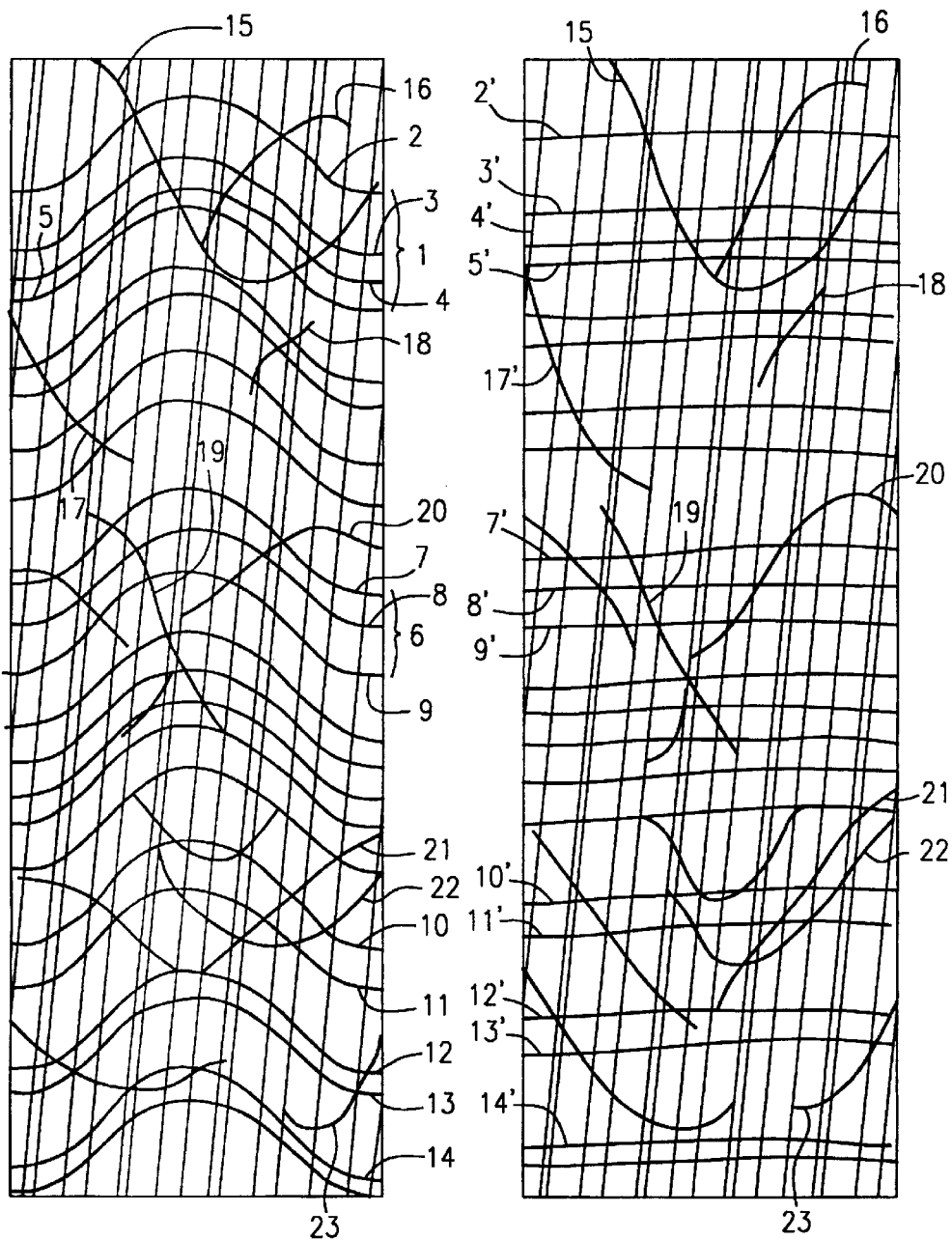

METHOD FOR AUTOMATIC DETECTION OF PLANAR HETEROGENEITIES CROSSING THE STRATIFICATION OF AN ENVIRONMENT

The present invention relates to a method for automatic detection of planar heterogeneities crossing the stratification of an environment or medium, from images of borehole walls or developments of core samples of the said environment.

Tools which are referred to by the references FMI (Fullbore Formation Micro Imager) and FMS (Formation Micro Scanner) and are marketed by the company SCHLUMBERGER, make it possible to acquire electrical images from measurements of the local electrical conductivity of the wall of a borehole.

An electrical image of the wall of a borehole is a developed view which has, on a plane, a horizontal axis x representing the azimuthal distribution of the electrodes of the pads of the tool which is used, and a vertical axis y along which the depth (dimension) of the tool in the borehole is defined.

The electrical image of the wall of a borehole or the image of a core sample development is analysed in terms of planar heterogeneities and point heterogeneities.

In terms of image analysis, the planar heterogeneities present on the image can be categorized by their conductivity relative to the background of the image, their sharpness (grey scale contrast), their organization (isolated or grouped by family), their frequency (high or low frequency according to direction and depth) and their visibility (visible on the entire image or only on a part of the image).

Thus, on a high-resolution image of the wall of a borehole and/or on a developed core sample image, two main types of geological heterogeneities can be observed. The first type is generally a geological event which intersects the borehole and which has an extent greatly in excess of the diameter of the well, such as stratification and fracture planes, whereas the second type has a radial and vertical extension limited to the scale of the borehole and of the acquisition device, such as vesicles, nodules or perturbations of the bioturbation type, etc.

A planar heterogeneity is observed on an image in the form of a sinusoid with a general equation $y=d+A (\sin x+\Phi$, in which the amplitude A and the phase $\Phi$ correspond respectively to the dip and to the azimuth of the plane intersecting the well when the plane and the axis of the well are not parallel, d being the depth at which the sinusoid is located.

The categorization criteria indicated above often make it possible to recognize the geological significance of the planar heterogeneity: stratification or fracturing. Stratification is generally regarded as the dominant planar heterogeneity on the image; it is the most visible event, indicates dominant orientation of the image and is organized in families (one family per level).

Fracturing is a more infrequent isolated event which intersects the stratification and is often partially visible, and several different families of fractures can be recognized on a given level.

Methods for automatic detection of the stratification planes have been proposed. One of the methods relates to high-frequency bedding planes, and another method relates to bed boundaries. Such methods are, in particular, described in Patent Application FR-A-2 749 405 and in publications such as that by S-J. Ye, J. Shen and N.Keskes (1995), "Automatic Identification of bedding planes from electrical borehole images", $9^{th}$ Scandinavian Conference on Image Analysis, Jun. 6–9 1995, Uppsala, Sweden, and S-J. Ye, Ph. Rabiller & N. Keskes (1997), "Automatic High resolution sedimentary dip detection on borehole imagery", SPWLA $38^{th}$ Annual Logging Symposium, paper O. These methods make it possible to detect the dominant planar heterogeneity without being perturbed by the other planar or point heterogeneities.

In most cases, because of the wide variety of facies which are encountered, automatic detection of fractures is perturbed by the interference of various types of planes and other heterogeneities.

Other methods for detecting heterogeneities have been proposed in the literature, such as those disclosed by J. N. Antoine & J. P. Delhomme (1990), "A method to derive dips from bed boundaries in borehole images", paper SPE 20540 $\Omega$, p. 131–130; by D. Torres, R. Strickland, & M. Gianzero (1990), "A new approach to determining dip and strike using borehole images", SPWLA 31st Annual Logging Symposium, June 24–27, K, 20 p or by J. Hall, M. Ponzi, M. Gonfalini, & G. Maletti (1996), "Automatic extraction and characterisation of geological features and textures from borehole images and core photographs", SPWLA $37^{th}$ Annual Logging Symposium, paper CCC.

The method of Antoine et al. consists in detecting the stratification planes from contours, referred to as flow lines, which are located on the pad image, then, while complying with certain criteria, in matching the flow lines from pad to pad using a dynamic programming algorithm. The flow lines are obtained from tracing the local orientations of the stratification throughout the image and from selection of the flow lines which lie at the points of inflection. This method detects the slightest details of the flow lines in the image. When there are complex zones in which the planar and point heterogeneities are mixed, and as the pad images obtained are narrow, a complex technique ensues which has serious implementation difficulties. This is because, in spite of a highly developed contour-matching algorithm, it is difficult to obtain satisfactory results in the various geological situations encountered, when this is on the basis of flow lines which are too detailed, unless numerous parameters are set as a function of the type of facies encountered, which would lead to an algorithm which is difficult to use under operational conditions.

The method advocated by Torres et al. consists in using the Hough transform which makes it possible to determine, from an image, the specific parameters characterizing a geometrical shape such as a straight line, a circle, an ellipse or a sinusoid, then in projecting points of the said shape into the parameter space referred to as the Hough space. The point of intersection of these projections in the Hough space represents the parameters of the desired shape.

One drawback with this method resides in the fact that the depth of the sinusoid is not integrated in the parameter space, which leads to inaccuracy in terms of the depth and therefore limitation of the amplitude of the sinusoid because of the window size used by Torres et al.; another drawback is that it requires a great deal of computation time and memory, increasing very rapidly as a function of the dimension of the Hough space, that is to say the number of parameters which are desired.

The method advocated by Hall et al. also uses the Hough transform, but by characterizing the Hough space in three dimensions, namely dip, azimuth and depth of the plane. The Hough transform is applied after contour detection which is carried out either on the basis of the binarized image or after classification of neighbouring pixels. It should be noted that binarizing an image with multiple grey levels by thresholding involves a significant loss of information, and that it would therefore be difficult to detect and distinguish contours with different contrasts in the moving window which is used.

The last methods described in brief above seek to detect all the types of planes by a single algorithm without hierarchization. However, the planes which are to be detected have very different characteristics, such as contrast, frequency, etc. For this reason, these methods cannot be efficiently employed to detect fracturing heterogeneities reliably and securely.

The object of the present invention is to overcome the drawbacks of the prior art methods and to provide a method which, taking into account the different characteristics of the stratification and fracturing heterogeneities, makes it possible to eliminate the stratification of the image in order to better visualize the planes intersecting the stratification in order to facilitate their detection.

The present invention relates to a method for automatic detection of planar heterogeneities crossing the stratification of an environment or medium, from images of borehole walls or developments of core samples of the said environment, in which an original image defined in a system of axes ($X_1$, $Y_1$, $Z_1$) which is associated with a borehole whose axis is $Z_1$ is used, the said image containing, for a zone of the environment through which the borehole passes, planar heterogeneities consisting of stratification planes and of planar heterogeneities intersecting the stratification planes, characterized in that it consists in:

determining a dominant orientation of the stratification planes which lie in at least one part of the said original image, filtering the original image in order to eliminate the planar heterogeneities of the stratification planes which lie in the dominant direction, and determining, on the said filtered image, at least contour segments of the heterogeneities which intersect the stratification planar heterogeneities.

According to another characteristic of the present invention, the method consists in calculating the apparent dips of the said stratification planes, and in subjecting the said stratification planes to a rotation which reduces their dip to the value zero so that the said stratification planes are perpendicular to the axis ($Z_1$) of the borehole, in such a way as to obtain a resultant image in which the stratification planar heterogeneities are horizontalized.

According to another characteristic of the present invention, the apparent dip of each stratification plane is calculated from the true dip of the said stratification plane and from the borehole's deviation determined at the intersection of the axis of the borehole with the said stratification plane.

According to another characteristic of the present invention, the filtering of the resultant image is carried out in the frequency domain.

According to another characteristic of the present invention, the filtering of the resultant images uses a Fourier transform process.

According to another characteristic of the present invention, the determination of the contour segments is carried out on a gradient image of the filtered image.

According to another characteristic of the present invention, the determination of the contour segments is performed by a process of crest line tracking by depth-first tree routing.

According to another characteristic of the present invention, the filtered image is transformed into a normalized image having the same contrast over its entire surface.

According to another characteristic of the present invention, the gradient image is obtained from the normalized image.

According to another characteristic of the present invention, the gradient image is smoothed in at least one of two perpendicular directions.

According to another characteristic of the present invention, the detection of the contours is performed on the gradient image smoothed in the two perpendicular directions.

According to another characteristic of the present invention, it furthermore consists in selecting segments of one of the chains of contours which satisfy a quality index.

According to another characteristic of the present invention, it furthermore consists in subjecting the image obtained after the steps subsequent to the filtering of the resultant image, to a rotation in order to bring the said image to its primitive position.

One advantage of the present invention resides in the fact that, by differentiating the stratification planar heterogeneities from the fracturing planar heterogeneities, it becomes possible to eliminate the stratification planar heteterogeneities in order to keep only the fracturing planar heterogeneities, which can therefore be detected very easily.

Another advantage of the present invention is that it is possible to differentiate fractures with different polarities.

Other characteristics and advantages of the present invention will emerge more clearly on reading the following description of the method according to the invention, as well as from the appended drawings, in which:

FIG. 1 is a schematic representation of an original image of the wall of a borehole;

FIG. 2 is a schematic representation of an image which is obtained from the original image and includes the horizontalized stratification planes;

Figure 3:
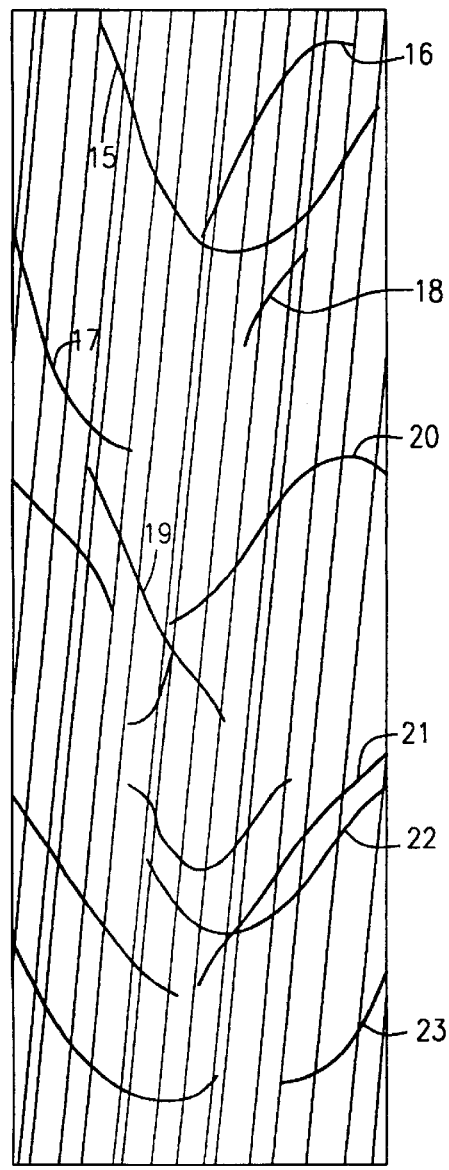
FIG. 3 is a schematic representation of a resultant image after filtering of the image in FIG. 2.

An original image I(x,y) of the wall of a borehole or of a photograph of a core sample development is schematically represented in FIG. 1 On this original image, several types of sinusoid can be observed which represent the intersections of planes with the borehole, such as planes corresponding to geological beds lying at various depths in the environment in which the borehole was drilled or from which a core sample was taken.

The geological beds, at the time when the sedimentary deposits were created, were plane and parallel and each lay in a horizontal plane. Following tectonic movements of the earth, these same geological beds were transformed to various degrees, giving rise to beds dipping to a greater or lesser extent in a certain direction. The beds of clay which were deposited in a calm environment are substantially horizontal. An original image thus principally contains, on the one hand, stratification planes which constitute the stratification planar heterogeneities and which can be grouped by families lying at different depths and, on the other hand, planar heterogeneities intersecting the stratification planes.

The intersections of the planar heterogeneities consisting of the stratification planes and the fracturing planes, with the borehole drilled in the environment containing these heterogeneities, are present on the image of the wall of the borehole in the form of sinusoids.

The sinusoids corresponding to the stratification planes are parallel and grouped in families. For example, a family 1, lying in the upper part of the figure, groups together the sinusoids referenced 2 to 5. Another family 6, lying substantially in the middle of the figure, groups together sinusoids which correspond to other stratification planes and are referenced 7 to 9. Other sinusoids corresponding to other stratification planes, such as 10, 11, 12, 13, 14, are also represented in the lower part of FIG. 1. The sinusoids, or parts of sinusoids, corresponding to fracturing heterogeneities, are also represented in FIG. 1, and these intersect the sinusoids corresponding to the stratification planes. Some of these sinusoids intersecting the so-called stratification sinusoids are referenced 15 to 23.

In a first step of the method according to the invention, the dominant orientation of the stratification planes which are detected in the borehole and appear on the image I(x,y) is determined, and the apparent dips of the said stratification planes are calculated, in a system of axes $(X_1, Y_1, Z_1)$ in which the borehole is located, the inclined direction of the borehole being the axis $Z_1$.

In a second step, the said stratification claims are subjected to a rotation which reduces their dip to the value zero so that the said stratification planes are perpendicular to the axis $Z_1$ of the borehole, in such a way as to obtain a resultant image in which the stratification planar heterogeneities are horizontalized. The effect of this rotation can be seen on the resultant image (FIG. 2) by transformation of the so-called stratification sinusoids into substantially horizontal straight lines. Thus, the sinusoids 2 to 5 of the original image are identified on the resultant image in FIG. 2 by the straight lines 2' to 5', while the sinusoids 7 to 14 are identified by the straight lines 7' to 14'.

On the resultant image in FIG. 2, the sinusoids corresponding to the fracturing heterogeneities, although having experienced the rotation, are substantially unchanged in comparison with those of the original image and are represented with the same references 15 to 23.

The horizontalization of the stratification planes may be performed, for example, by one or other of the following two techniques:

a) detecting the dominant orientation of the image then, on the basis of this, deducing the sinusoids of the stratification planes, (apparent stratification planes) and then transforming the sinusoids into straight lines on the image.

This is a local solution which does not require knowledge of the deviation of the borehole. This technique does not make it possible to process blind zones, that is to say ones without a dominant orientation, and it is sensitive to occasional errors in detecting stratification sinusoids.

b) detecting the orientation of the image and, on the basis of that, performing the following successive operations:

determining the sinusoids of the stratification planes;

transforming the apparent stratification planes into true stratification planes;

looking for the reference structural plane in the geodesic frame;

transforming the true reference plane into an apparent plane by considering the deviation of the borehole at each depth; and lastly transforming the stratification sinusoids (apparent planes) into straight lines on the image.

This is a global technique which performs better because it makes it possible to overcome the problems associated with blind zones and with errors in detecting stratification sinusoids.

The transformation from true plane to apparent plane (and apparent to true, respectively) is performed by a rotation which transforms the geodesic system of axes, with respect to which the true dip is calculated, into the system of axes $H_1$ $(X_1, Y_1, Z_1)$ in which $Z_1$ is the axis of the borehole, $X_1$ is the axis perpendicular to East and to the axis $Z_1$, and $Y_1$ is perpendicular to the two axes $X_1$ and $Z_1$. This transformation may advantageously be carried out by going through an intermediate system of axes $H_2$ $(X_2, Y_2, Z_2)$ in which $Z_2$ coincides with $Z_1$, $X_2$ is the azimuth direction of the borehole, perpendicular to $Z_2$, and $Y_2$ is an axis perpendicular to $X_2$ and $Z_2$, as described in the thesis by Shin-Ju Ye of 16.01.97 entitled "Analyse d'imagerie de paroi de puits:detection automatique des heterogeneites sedimentaires et tectoniques" [Borehole wall imagery analysis: automatic detection of sedimentary and tectonic heterogeneities].

In a second step, assuming that the determination of the dominant orientation and, where appropriate, the rotation of the stratification planes have been carried out in a first step, the resultant image in FIG. 2 is filtered in the frequency domain, for example by working on this image's frequency spectrum, obtained by Fourier transform of the latter, so as to eliminate from the said resultant image the stratification planar heterogeneities with dominant orientation which may have been horizontalized.

The Fourier transform makes it possible to change from a representation of the image in the space domain I(x,y) to a representation in the frequency domain I(u,v) in which the amplitudes and the orientations of the components with different frequencies in the image I(x,y) are observed. Next, certain frequencies distributed with a particular orientation in the image are eliminated, for example by zeroing (in the case of the horizontalized stratification planes) the frequencies which it is desired to eliminate. After a fast Fourier transform (FFT), oriented filtering is performed on the Fourier spectrum, then an inverse Fourier transform (FFT$^{-1}$) is carried out on the result of the filtering, in order to produce a filtered image I' (x,y) in the space domain.

This filtering can be schematized as follows:

$$I(x,y) \rightarrow FFT \rightarrow *H(u,v) \rightarrow FFT^{-1} \rightarrow I'(x,y)$$

where $$H(u, v) = \begin{cases} 0 \text{ if } \frac{v}{u} = \tan(r - 90°) \\ \overline{1 \text{ everywhere else}} \end{cases}$$

r being the orientation of the elements to be suppressed. A filtered image is thus obtained in which all the lines of orientation r are eliminated. The orientation r of the horizontalized stratification heterogeneities is equal to zero.

The result of the filtering can be observed in FIG. 3, which schematically represents the filtered image.

Preferably, although not necessarily, a rotation which is the inverse of the previous one is performed in order to recover the original or primitive geometry of the remaining planes. It should be noted that this inverse rotation can be performed at any time after the filtering of the resultant image, that is to say after one of the following operations.

In a third step, contour segments of the intersecting planar heterogeneities remaining on the said filtered image are determined.

This contour or contour segment determination is preferably performed by carrying out the following sequence of operations:

1. Dynamic Normalization of the Histogram of the Filtered Image

Given that the dynamic range and the contrast of the filtered image, and therefore of the original image, may be widely varied in different types of lithologies, dynamic normalization of the histogram of the filtered image is performed in order to homogenize the visibility of the fractures in all the lithology types and to have an image exhibiting a same contrast over the entire surface of the image.

To that end, a sliding window is used. For each depth, a linear transformation of the histogram y=f(x) is performed, in which the new histogram's range [a, b], which is identical for each depth, corresponds to the minimum value c and the maximum value d of a certain percentage (for example 96%) of the original histogram. In this way, a normalized filtered image (not shown) is obtained. The normalization of an image is well-known to those skilled in the art and will therefore not be described in further detail.

2. Obtaining the Gradient (first derivative) Image of the Filtered Image

Although the gradient image can be calculated directly from the filtered image, it is preferable to calculate it from the normalized filtered image.

The first and second derivatives of an image are very important characteristics; for example, the maxima and minima of the first derivative and the zero crossings of the second derivative can be used to detect the contours of the image. Gaussian filters and exponential filters are smoothing filters which are widely used in image processing. The smoothing and the calculation of the derivatives of the image can be carried out simultaneously by convoluting the image, for example the normalized image, with the derivatives of the smoothing filter.

The exponential filter is regarded as an optimum filter for this purpose. Furthermore, exponential filters and their derivatives can be formed by very simple and fast recursive algorithms (by a cascade of two exponential filters on a single side (left and right), each being formed by a first-order recursive algorithm).

Each exponential filter is an impulse response of the following form:

$$f_c(X) = (\alpha/2)e^{-\alpha|x|}$$

Using the convolution theorem, the impulse response of the cascade of two exponential filters is then $$f(x) = f_c(x) * f_c(x)$$
$$= (\alpha^2/4)[(1/\alpha) + |x|]e^{-\alpha|x|}$$

and the first derivative of f(x) is $$f'(x) = f'_c(x) * f_c(x)$$
$$= -(\alpha^3/4) x e^{-\alpha|x|}$$

On the normalized filtered image, filtering of the first derivative of the image is performed along the depth of the borehole. This makes it possible to smooth the gradient image and, at the same time, strengthen, that is to say improve, the visibility of the frequency of the information which is desired. The smoothing is commensurately better the smaller alpha is. A satisfactory result is obtained with $\alpha=0.3$, for example. This one-dimensional application also makes it possible to eliminate the vertical artefacts of the image of the wall of the borehole which are due to malfunction of certain sensors. A gradient image smoothed in the direction of the borehole (axis $Z_1$) is obtained.

3. Complementary Smoothing of the Gradient Image

In order to make it easier to detect contours in the following operation, it is advantageous to smooth the gradient image as well in the direction perpendicular to the depth of the borehole. Given the narrowness of the pad image of the borehole wall, this may be performed by mean, arithmetic or median filters. The median filter consists in classifying the neighbouring pixels and the current pixel by increasing (or decreasing) values, then assigning the median value of the classified pixels to the current pixel. Another image smoothed in the direction perpendicular to the axis $Z_1$ of the borehole is thus obtained.

4. Detection of the Planar Heterogeneity Contours

The contour segments of planar heterogeneities visible on the gradient image (image of the first derivative) are in the form of roof-shaped contours, that is to say the points of the contours lie at the local maxima or minima of the signal.

Given that the purpose of detecting the planar heterogeneity contours is to reconstruct the planes passing through the well, it is not enough to make do with merely extracting contour points, but instead chains of contours are extracted in which each point is ordered on the same plane. This requires very elaborate contour tracking algorithms. The process of crest line tracking by depth-first tree routing is designed exclusively to look for contours of planes. It is capable of detecting contours which have shallow or very steep slopes (except vertical), which are linear, zig-zags, or even dotted (that is to say formed by points which are isolated but aligned). The process of crest line tracking by depth-first tree routing is described in the thesis by Mrs Shin-Ju Ye, pages 49 to 52; likewise, recursive exponential filters are explained in the said thesis on pages 45 to 48. The relevant parts of the said thesis are incorporated in the present description.

In order to determine whether a chain is actually a contour segment of planar heterogeneity, quantitative coherence criteria are used, namely:

visibility: in order for a plane to be detectable, it is necessary for it to be visible on the image, and therefore for it to have a high amplitude, continuity of visibility, linearity and length: in comparison with point heterogeneity, the signature of planar heterogeneity should be continuously visible, linear and sufficiently long.

These criteria make it possible to evaluate a quality index for each contour:

$$Q = \beta V C L$$

where $\beta$ is a normalization constant, V is the visibility, C is the continuity of visibility, L the linearity:

$$V = \overline{A}_{mp}, \quad C = N_{pv} \frac{\overline{A}_{mp}}{V_{amp}}, \quad L = \varepsilon \left( \frac{D(P_0, P_1)}{N} \right)^2$$

where $A_{mp}$ is the mean amplitude of the segment, $N_{pv}$ is the number of points visible, a point is visible if its amplitude is greater than a threshold $S_{amp}$, $V_{amp}$ is the variance of the amplitude of points of the segment, $\varepsilon$ is the thickness of the segment, calculated from the maximum distance between the straight line joining the two end points of the segment and the points of the segment, $D(P_0, P_1)$ is the distance between the two end points of the segment $P_0$ and $P_1$, and N is the number of points of the segment.

For the chains which have a minimum length, thresholding is performed on the quality Q of the segment in order to select fracture chains from a set of chains detected. Given that the contrast dynamic range of the image is normalized, a single threshold for the quantity Q is sufficient for the entire image.

In the present method, if a chain has a low quality Q, it is cut into two by the point furthest from the straight line joining the ends of the chain; the two parts are examined separately, and so on. This makes it possible to detect certain segments, parts of which are seen on the image.

Figure 4:
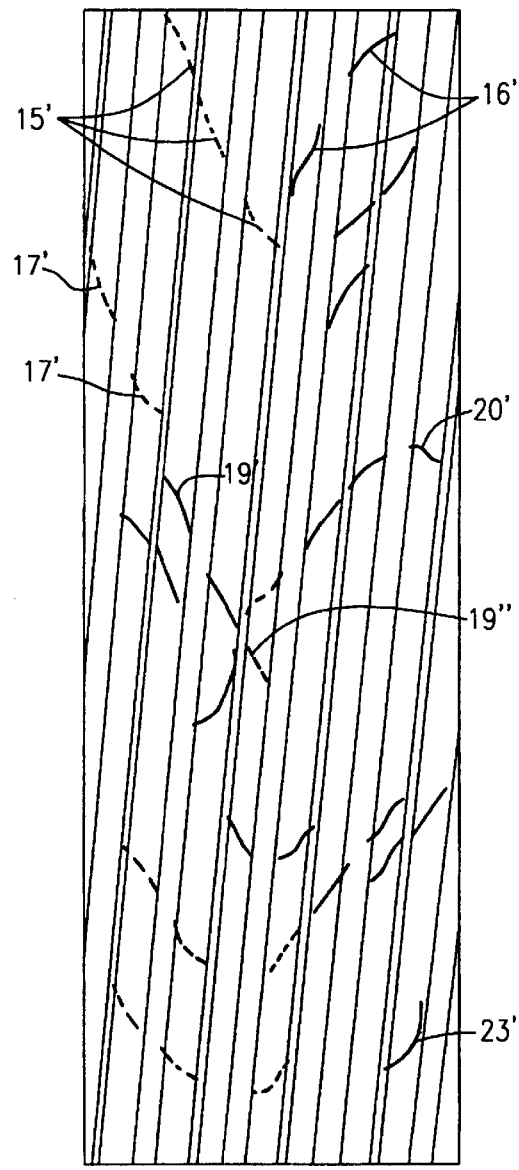
FIG. 4 is a schematic representation of the final image comprising contour segments of the fractures detected.
Figure 5:
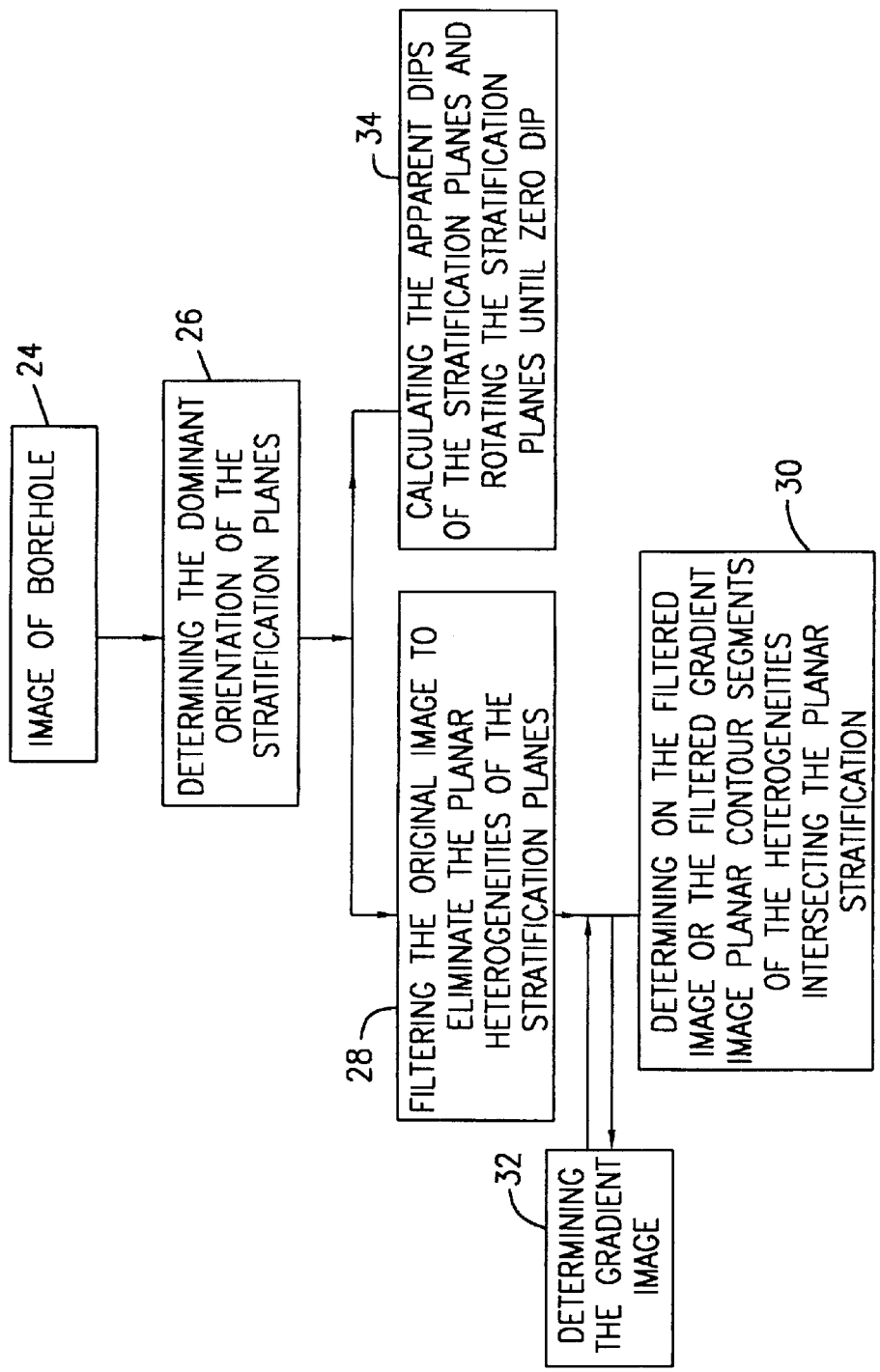
FIG. 5 is a flowchart of the process.

FIG. 4 shows the result of the detection of the contour segments of fracturing planes. The segments in solid lines, such as the segments 16', 19', 20' or 23' and the segments in dots, such as the segments 15', 17', mean that there are different polarities, corresponding to local minima or maxima. The dotted segments correspond to local minima whereas the solid segments correspond to local maxima.

Comparing FIGS. 3 and 4, it can be seen that some of the sinusoids in FIG. 3, such as the sinusoid part 19, may correspond in FIG. 4 to segments 19' (solid line) and to segments 19" (dotted) which have different polarities.

Since the horizontalization of the stratification planes affects the entire image, and therefore the planar heterogeneities intersecting the stratification, it is preferable to make an inverse rotation in order to recover the original geometry of the planar heterogeneities which intersect the stratification, after the horizontalized stratifications have been eliminated.

It is clear that what has been described above also applies to images of borehole walls irrespective of the measured parameter which forms the former, such as for example magnetic susceptibility, photoelectric factor, density of the formation, amplitude of the sonic reflections, etc.

What is claimed is:

1. Method for automatic detection of planar heterogeneities crossing the stratification of an environment, from images of borehole walls or developments of core samples of the said environment, in which an original image defined in a system of axes ($X_1$, $Y_1$, $Z_1$) which is associated with a borehole whose axis is $Z_1$ is used, the said image containing, for a zone of the environment through which the borehole passes, patterns of planar heterogeneities consisting of stratification planes (2 to 14) and of planar heterogeneities (15 to 23) intersecting the stratification planes, wherein the method consists of:

determining a dominant orientation of the stratification planes (2 to 14) which lie in at least one part of the said original image, filtering the original image in order to eliminate the planar heterogeneities of the stratification planes (2 to 14) which lie in the dominant direction, and determining, on the said filtered image, at least contour segments (15' to 23') of the heterogeneities which intersect the stratification planar heterogeneities.

2. Method according to claim 1, wherein the method further consists of calculating the apparent dips of the stratification planes, and in subjecting the said stratification planes to a rotation which reduces their dip to the value zero so that the stratification planes are perpendicular to the axis ($Z_1$) of the borehole, in such a way as to obtain a resultant image in which the stratification planar heterogeneities are horizontalized.

3. Method according to claim 2, wherein the apparent dip of each stratification plane is calculated from the true dip of the said stratification plane and from the borehole's deviation determined at the intersection of the axis of the borehole with the said stratification plane.

4. Method according to claim 2, wherein the filtering of the resultant image is carried out in the frequency domain.

5. Method according to claim 2, wherein the filtering of the resultant images uses a Fourier transform process.

6. Method according to claim 1, wherein the determination of the contour segments (15' to 23') is carried out on a gradient image of the filtered image.

7. Method according to claim 6, wherein the determination of the contour segments (15' to 23') is performed by a process of crest line tracking by depth-first tree routing.

8. Method according to claim 1, wherein the filtered image is transformed into a normalized image having a same contrast over its entire surface.

9. Method according to claim 6, wherein the gradient image is obtained from the normalized image.

10. Method according to claim 6, wherein the gradient image is smoothed in at least one of two perpendicular directions.

11. Method according to claim 10; wherein the detection of the contours is performed on the gradient image smoothed in the two perpendicular directions.

12. Method according to claim 1, wherein the method furthermore consists of selecting segments of one of the chains of contours which satisfy a quality index.

13. Method according to claim 1, wherein the method furthermore consists of subjecting the image obtained after the steps subsequent to the filtering of the resultant image, to a rotation in order to bring the said image to its primitive position.

* * * * *